(12) United States Patent
Yoshizawa

(10) Patent No.: US 7,818,359 B2
(45) Date of Patent: Oct. 19, 2010

(54) DIRECT DIGITAL SYNTHESIZER, DIRECT DIGITAL SYNTHESIZER FOR TRANSMISSION AND DETECTION, AND MRI APPARATUS

(75) Inventor: Nobuhiro Yoshizawa, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 1066 days.

(21) Appl. No.: 11/532,686

(22) Filed: Sep. 18, 2006

(65) Prior Publication Data

US 2007/0064834 A1 Mar. 22, 2007

(30) Foreign Application Priority Data

Sep. 22, 2005 (JP) .............................. 2005-275978
Mar. 28, 2006 (JP) .............................. 2006-086771

(51) Int. Cl.
*G06F 7/38* (2006.01)
*G06K 9/46* (2006.01)
(52) U.S. Cl. ...................................... 708/290; 382/244
(58) Field of Classification Search ................. 708/290; 380/269; 348/14.13
See application file for complete search history.

(56) References Cited

U.S. PATENT DOCUMENTS

| 4,951,004 | A | | 8/1990 | Sheffer et al. |
| 4,992,743 | A | | 2/1991 | Sheffer |
| 4,998,072 | A | | 3/1991 | Sheffer |
| 5,291,428 | A | | 3/1994 | Twitchell et al. |
| 5,436,600 | A | * | 7/1995 | Van Heteren et al. ........ 332/167 |
| 5,869,965 | A | * | 2/1999 | Du et al. ..................... 324/309 |
| 5,878,335 | A | | 3/1999 | Kushner |
| 5,898,325 | A | | 4/1999 | Crook et al. |
| 5,903,823 | A | * | 5/1999 | Moriyama et al. ........... 455/126 |
| 5,999,581 | A | | 12/1999 | Bellaouar et al. |
| 6,034,573 | A | * | 3/2000 | Alderton ..................... 332/125 |
| 6,198,353 | B1 | * | 3/2001 | Janesch et al. ............... 331/16 |
| 6,862,435 | B2 | * | 3/2005 | Miyano et al. ........... 455/114.1 |
| 2003/0174784 | A1 | * | 9/2003 | Samarasooriya et al. .... 375/308 |
| 2005/0289205 | A1 | * | 12/2005 | Chatterjee ................... 708/300 |

FOREIGN PATENT DOCUMENTS

JP 2002-280838 9/2002

OTHER PUBLICATIONS

Lionel Cordesses, Direct Digital Synthesis: A Tool for Periodic Wave Generation (Part 1), 2004, pp. 50-54.*
SIPO, China issued in connection with corresponding CN Application No. 200610139527.8 on Feb. 12, 2010.

* cited by examiner

*Primary Examiner*—Lewis A Bullock, Jr.
*Assistant Examiner*—Kevin Hughes
(74) *Attorney, Agent, or Firm*—Armstrong Teasdale LLP

(57) ABSTRACT

In order to output amplitude data with the clock frequency higher than the clock frequency of phase data, the direct digital synthesizer for transmission and detection comprises: a transmitting phase for outputting a first phase data with a first clock frequency; a curtailing unit for outputting a second phase data with a second clock frequency smaller than the first clock frequency, and outputting additional data for compensating for phase information disappeared with curtailing process; an interpolating unit for outputting a third phase data with a third clock frequency larger than the first frequency by implementing interpolating process to the second phase data, and a detecting waveform for outputting amplitude data in accordance with the third phase data. The detecting signal amplitude data can be outputted with the third clock frequency higher than the second clock frequency of the second phase data transmitted.

18 Claims, 9 Drawing Sheets

DIRECT DIGITAL SYNTHESIZER, DIRECT DIGITAL SYNTHESIZER FOR TRANSMISSION AND DETECTION, AND MRI APPARATUS

CROSS REFERENCE TO RELATED APPLICATIONS

This application claims the benefit of Japanese Application Nos. 2005-275978 filed Sep. 22, 2005, and 2006-086771 filed Mar. 28, 2006.

BACKGROUND FOR THE INVENTION

The present invention relates to a direct digital synthesizer, a direct digital synthesizer for transmission and detection, and an MRI (Magnetic Resonance Imaging) apparatus and more specifically to a direct digital synthesizer, a direct digital synthesizer for transmission and detection, and an MRI apparatus for outputting amplitude data with the clock frequency higher than that of phase data.

A direct digital synthesizer comprising a phase accumulator for outputting phase data and a waveform LUT (Look-Up Table) for outputting amplitude data in accordance with phase data has been proposed (for example, refer to the Patent Document 1).

[Patent Document 1] JP-A 2002-280838 ([0003], [0004])

For example, it is required in some cases to lower the clock frequency of phase data because of the reason in transmission of phase data and to output amplitude data with the clock frequency higher than that of phase data because of the reason in processing of amplitude data.

However, the direct digital synthesizer of the related art has been accompanied by the problem that the clock frequency of phase data is matched with the clock frequency of amplitude data and the amplitude data cannot be outputted with the clock frequency higher than that of phase data.

SUMMARY OF THE INVENTION

Therefore, an object of the present invention is to provide a direct digital synthesizer, a direct digital synthesizer for transmission and detection, and an MRI apparatus for outputting amplitude data with the clock frequency higher than that of phase data.

According to the first aspect, the present invention provides the direct digital synthesizer comprising a phase accumulator for outputting phase data (P1) with the clock frequency f1, an interpolating means for outputting phase data (P3) with the clock frequency f3 (>f1) by implementing interpolating process to the phase data (P1), and a waveform LUT for outputting amplitude data (S) in accordance with the phase data (P3) outputted from the interpolating means.

In the direct digital synthesizer according to the first aspect, the phase accumulator outputs phase data (P1) with the clock frequency f1, the interpolating means implements interpolating process to the phase data (P1) to convert the phase data (P1) to the phase data (P3) with the clock frequency f3 (>f1) and then inputs the phase data (P3) with the clock frequency f3 to the waveform LUT. Thereby, the amplitude data (S) can be outputted with the clock frequency f3 higher than the clock frequency f1 of the phase data.

According to the second aspect, the present invention provides the direct digital synthesizer explained in the direct digital synthesizer according to the first aspect, characterized in that a first space where the phase accumulator is provided is spatially separated from a second space where the interpolating means and the waveform LUT are provided.

In the direct digital synthesizer according to the second aspect, the phase data (P1) is transmitted to the second space from the first space, but since the clock frequency f1 of the phase data (P1) can be lowered than the clock frequency f3 of the amplitude data (S), reliability in transmission of the phase data (P1) can be improved.

According to the third aspect, the present invention provides the direct digital synthesizer characterized by comprising a phase accumulator for outputting phase data (P1) with the clock frequency f1, a curtailing means for outputting phase data (P2) with the clock frequency f2 (<f1) by implementing curtailing process to the phase data (P1) and also outputting additional data (A) for compensating for phase information disappeared with the curtailing process, an interpolating means for outputting phase data (P3) with the clock frequency f3 (>f2) by implementing interpolating process in accordance with the phase data (P2) and the additional data (A) outputted from the curtailing means, and a waveform LUT for outputting amplitude data (S) in accordance with the phase data (P3) outputted from the interpolating means.

In the direct digital synthesizer according to the third aspect, the phase accumulator outputs the phase data (P1) with the clock frequency f1, but the curtailing means converts the phase data (P1) to the phase data (P2) of the clock frequency f2 (<f1) and then transmits the same phase data (P2). The interpolating means having received the phase data (P2) converts the same data to the phase data (P3) of the clock frequency f3 (>f2) by implementing interpolating process to the phase data (P2) and then inputs the phase data (P3) of the clock frequency f3 to the waveform LUT. Accordingly, the amplitude data (S) can be output with the clock frequency f3 higher than the clock frequency f2 of the phase data (P2) transmitted.

Alias generated because a part of the phase information is lost with the curtailing process can be eliminated with the additional data (A).

According to the fourth aspect, the present invention provides the direct digital synthesizer, in the direct digital synthesizer according to the third aspect, characterized in that a first space where the phase accumulator and the curtailing means are provided is separated spatially from a second space where the interpolating means and the waveform LUT are provided.

In the direct digital synthesizer according to the fourth aspect, the phase data (P2) is transmitted to the second space from the first space, but since the clock frequency f2 of the phase data (P2) can be lowered than the clock frequency f3 of the amplitude data (S), transmission reliability of the phase data (P2) can be improved.

According to the fifth aspect, the present invention provides the direct digital synthesizer for transmission and detection characterized by comprising a phase accumulator for outputting phase data (P1) with the clock frequency f1, a transmitting waveform LUT for outputting transmitting signal amplitude data (T) in accordance with the phase data (P1), a curtailing means for outputting phase data (P2) with the clock frequency f2 by implementing curtailing process to the phase data (P1) and also outputting additional data (A) for compensating for phase information disappeared with curtailing process, an interpolating means for outputting phase data (P3) with the clock frequency f3 (>f2) by implementing curtailing process in accordance with the phase data (P2) and the additional data (A) outputted from the curtailing means, and a detecting waveform LUT for outputting detecting signal amplitude data (S) in accordance with the phase data (P3) outputted from the interpolating means.

In the direct digital synthesizer for transmission and detection according to the fifth aspect explained above, the transmitting phase accumulator outputs the phase data (P1) with the clock frequency f1 matched with the clock frequency of the transmitting signal amplitude data (T), but the curtailing means converts the phase data (P1) to the phase data (P2) of the clock frequency f2 (<f1) and then transmits the same phase data (P2), and the interpolating means having received the phase data (P2) converts the same phase data to the phase data (P3) with the phase data frequency f3 (>f2) matched with the clock frequency of the detecting signal amplitude data (S) by implementing interpolating process to the phase data (P2) and then inputs the phase data (P3) of the clock frequency f3 to the detecting waveform LUT. Accordingly, the detecting signal amplitude data (S) can be outputted with the clock frequency f3 higher than the clock frequency f2 of the phase data (P2) transmitted.

Alias generated because a part of the phase information is lost with the curtailing process can be eliminated with the additional data (A).

According to the sixth aspect, the present invention provides the direct digital synthesizer for transmission and detection according to the fifth aspect is characterized in that a first space where the transmitting phase accumulator, the transmitting waveform LUT, and the curtailing means are provided is spatially separated from a second space where the interpolating means and the detecting waveform LUT are provided.

In the direct digital synthesizer for transmission and detection according to the sixth aspect, the phase data (P2) is transmitted to the second space from the first space, but since the clock frequency f2 of the phase data (P2) can be lowered than the clock frequency f3 of the amplitude data (S), transmitting reliability of the phase data (P2) can be improved.

For example, in the MRI apparatus, the first space is a transmitting unit, while the second space is a receiving unit.

According to the seventh aspect, the present invention provides the direct digital synthesizer for transmission and detection, in the direct digital synthesizer for transmission and detection according to the fifth aspect or the sixth aspect, characterized in that the clock frequency f1 is 40 MHz, the phase data (P1) of clock frequency f1 is 12 bits, the transmitting signal amplitude data (T) is 14 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and the detecting signal amplitude data (S) is 14 bits.

The direct digital synthesizer for transmission and detection according to the seventh aspect is suitable for an MRI apparatus.

According to the eighth aspect, the present invention provides the direct digital synthesizer for transmission and detection characterized by comprising a transmitting phase accumulator for outputting phase data (P1) with the clock frequency f1, a transmitting waveform LUT for outputting transmitting signal amplitude data (T) in accordance with the phase data (P1), a difference phase accumulator for outputting difference phase data (Δ1) with the clock frequency f1, an adding means for outputting phase data (P1') with the clock frequency f1 by adding the phase data (P1) and the difference phase data (Δ1), a curtailing means for outputting phase data (P2) with the clock frequency f2 (<f1) by implementing curtailing process to the phase data (P1') outputted from the adding means and outputting also additional data (A) for compensating for phase information disappeared with curtailing process, an interpolating means for outputting phase data (P3) with the clock frequency f3 (>f2) by implementing interpolating process in accordance with the phase data (P2) and the additional data (A) outputted from the curtailing means, and a detecting waveform LUT for outputting detecting signal amplitude data in accordance with the phase data (P3) outputted from the interpolating means.

In the direct digital synthesizer for transmission and detection according to the eighth aspect, the transmitting phase accumulator outputs the phase data (P1) with the clock of the clock frequency f1 matched with the clock frequency of the transmitting signal amplitude data (T), but the curtailing means converts the phase data (P1) to the phase data (P2) of the clock frequency f2 (<f1) and transmits the same phase data (P2). The interpolating means having received the same phase data (P2) converts the phase data (P2) to the phase data (P3) of the clock frequency f3 (>f2) matched with the clock frequency of detecting signal amplitude data (S) by implementing interpolating process to the phase data (P2) and then inputs the phase data (P3) of the clock frequency f3 to the detecting waveform LUT. Therefore, the detecting signal amplitude data (S) can be outputted with the clock frequency f3 higher than the clock frequency f2 of the phase data (2) transmitted.

Alias generated because a part of the phase information is lost with the curtailing process can be eliminated with the additional data (A).

Moreover, the frequency of transmitting signal (not equal to the clock frequency f1) and the frequency of detecting signal (not equal to the clock frequency f3) can be varied with the difference phase accumulator.

According to the ninth aspect, the present invention provides the direct digital synthesizer for transmission and detection, in the direct digital synthesizer according to the eighth aspect, characterized in that a first space where the transmitting phase accumulator, the transmitting waveform LUT, the difference phase accumulator, and the curtailing means are provided is separated spatially from a second space where the interpolating means and the detecting waveform LUT are provided.

In the direct digital synthesizer for transmission and detection according to the ninth aspect explained above, the phase data (P2) is transmitted to the second space from the first space but since the clock frequency f2 of phase data (P2) can be lowered than the clock frequency f3 of the amplitude data (S), transmission reliability of the phase data (P2) can be improved.

For example, the first space is a transmitting unit and the second space is a receiving unit in the MRI apparatus.

According to the tenth aspect, the present invention provides the direct digital synthesizer for transmission and detection, in the direct digital synthesizer for transmission and detection according to the ninth aspect, characterized in that the clock frequency f1 is 40 MHz, the phase data (P1) of clock frequency f1 is 12 bits, the transmitting signal amplitude data (T) is 14 bits, the difference phase data (Δ1) is 12 bits, the phase data (P1') outputted from the adding means is 12 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and the detecting signal amplitude data (S) is 14 bits.

The direct digital synthesizer for transmission and detection according to the tenth aspect is suitable for an MRI apparatus.

According to the eleventh aspect, the present invention provides the direct digital synthesizer characterized by comprising a phase accumulator for outputting phase data (P1) with the clock frequency f1, a difference outputting means for outputting difference data (V1) of the phase data (P1), an absolute value outputting means for recovering and outputting the phase data (P1) from the difference data (V1), an interpolating means for outputting phase data (P3) with the clock frequency f3 (>f1) by implementing interpolating process to the phase data (P1) outputted from the absolute value outputting means, and a waveform LUT for outputting amplitude data (S) in accordance with the phase data (P3) outputted from the interpolating means.

When the phase data (P1) is transmitted, signal is varied in the transmission line for every period 1/f1 of the clock frequency f1. Such variation changes to noise in some cases.

Therefore, in the direct digital synthesizer according to the eleventh aspect explained above, the phase data (P1) is not transmitted and difference data (V1) of the phase data (P1) is transmitted. When difference of the phase data (P1) for every period 1/f1 of the clock frequency f1 is constant, noise is not generated because the signal does not change in the transmission line.

According to the twelfth aspect, the present invention provides the direct digital synthesizer, in the direct digital synthesizer according to the eleventh aspect, characterized in that a first space where the phase accumulator and the difference outputting means are provided is separated spatially from a second space where the absolute value outputting means, the interpolating means, and the waveform LUT are provided.

In the direct digital synthesizer according to the twelfth aspect explained above, when the difference data (V1) is transmitted to the second space from the first space and difference of the phase data (P1) is constant, noise is not generated because the signal does not change in the transmission line.

According to the thirteenth aspect, the present invention provides the direct digital synthesizer characterized by comprising a phase accumulator for outputting phase data (P1) with the clock frequency f1, a curtailing means for outputting phase data (P2) with the clock frequency f2 (<f1) by implementing curtailing process to the phase data (P1) and outputting also addition data (A) for compensating for phase information disappeared with the curtailing process, a difference outputting means for outputting difference data (V2) of the phase data (P2), an absolute value outputting means for recovering and outputting the phase data (P2) from the difference data (V2), an interpolating means for outputting phase data (P3) with the clock frequency f3 (>f2) by implementing interpolating process in accordance with the phase data (P2) and additional data (A) outputted from the absolute value outputting means, and a waveform LUT for outputting amplitude data (S) in accordance with the phase data (P3) outputted from the interpolating means.

When the phase data (P2) is transmitted, since the signal changes in the transmission line for every period 1/f2 of the clock frequency f2, such change appears as noise in some cases.

Therefore, the phase data (P2) is not transmitted and the difference data (V2) of the phase data (P2) is transmitted in the direct digital synthesizer according to the thirteenth aspect explained above. When difference of the phase data (P2) for every period 1/f2 of the clock frequency f2 is constant, noise is not generated because the signal does not change in the transmission line.

According to the fourteenth aspect, the present invention provides a direct digital synthesizer, in the direct digital synthesizer according to the thirteenth aspect, characterized in that a first space where the phase accumulator, the curtailing mans, and the difference outputting means are provided is spatially separated from a second space where the absolute value outputting means, the interpolating means, and the waveform LUT are provided.

In the direct digital synthesizer according to the fourteenth aspect explained above, when the difference data (V2) is transmitted to the second space from the first space and difference of the phase data (P2) is constant, noise is not generated because the signal does not change in the transmission line.

According to the fifteenth aspect, the present invention provides the direct digital synthesizer for transmission and detection characterized by comprising a transmitting phase accumulator for outputting phase data (P1) with the clock frequency f1, a transmitting waveform LUT for outputting transmitting signal amplitude data (T) in accordance with the phase data (P1), a curtailing means for outputting phase data (P2) with the clock frequency f2 (<f1) by implementing curtaining process to the phase data (P1) and outputting also additional data (A) for compensating for phase information disappeared with the curtailing process, a difference outputting means for outputting difference data (V2) of the phase data (P2), an absolute value outputting means for recovering and outputting the phase data (P2) from the difference data (V2), an interpolating means for outputting phase data (P3) with the clock frequency f3 (>f2) by implementing curtailing process in accordance with the phase data (P2) and the additional data (A) outputted from the absolute value outputting means, and a detecting waveform LUT for outputting detecting signal amplitude data (S) in accordance with the phase data (P3) outputted from the interpolating means.

When the phase data (P2) is transmitted, since the signal changes for every period 1/f2 of the clock frequency f2, such change appears as noise in some cases.

Therefore, the phase data (P2) is not transmitted, and the difference data (V2) of the phase data (P2) is transmitted in the direct digital synthesizer for transmission and detection according to the fifteenth aspect explained above. When difference of the phase data (P2) for every period 1/f2 of the clock frequency f2 is constant, noise is not generated because the signal does not change in the transmission line.

According to the sixteenth aspect, the present invention provides the direct digital synthesizer for transmission and detection, in the direct digital synthesizer according to the fifteenth aspect, characterized in that a first space where the transmitting phase accumulator, the transmitting waveform LUT, the curtailing means, and the difference outputting means are provided is spatially separated from a second space where the absolute value outputting means, the interpolating means, and the detecting waveform LUT are provided.

In the direct digital synthesizer for transmission and detection according to the sixteenth aspect, when the difference data (V2) is transmitted to the second space from the first space and difference of the phase data (P2) is constant, noise is not generated because the signal does not change in the transmission line.

According to the seventeenth aspect, the present invention provides the direct digital synthesizer for transmission and detection, in the direct digital synthesizer for transmission and detection according to the fifteenth or sixteenth aspect, characterized in that the clock frequency f1 is 40 MHz, the phase data (P1) of clock frequency f1 is 12 bits, the transmitting signal amplitude data (T) is 14 bits, the clock frequency f2 is 10 MHz, the phase data (P2) of clock frequency f2 is 12 bits, the additional data (A) is 2 bits, the clock frequency f2 is 80 MHz, and the phase data (P3) of clock frequency f3 is 12 bits, and the detecting signal amplitude data (S) is 14 bits.

The direct digital synthesizer for transmission and detection according to the seventeenth aspect is suitable for an MRI apparatus.

According to the eighteenth aspect, the present invention provides the direct digital synthesizer for transmission and detection characterized by comprising a transmitting phase accumulator for outputting phase data (P1) with the clock frequency f1, a transmitting waveform LUT for outputting transmitting signal amplitude data (T) in accordance with the phase data (P1), a difference phase accumulator for outputting difference phase data (Δ1) with clock frequency f1, an adding means for outputting phase data (P1') with the clock frequency f1 by adding the phase data (P1) and the difference phase data (Δ1), a curtailing means for outputting phase data (P2) with the clock frequency f2 (<f1) by implementing curtailing process to the phase data (P1') outputted from the adding means and outputting also additional data (A) for compensating for phase information disappeared with the curtailing process, a difference outputting means for outputting difference data (V2) of the phase data (P2), an absolute value outputting means for recovering and outputting the phase data (P2) from the difference data (V2), an interpolating means for outputting phase data (P3) with the clock frequency f3 (>f2) by implementing interpolating process in accordance with the phase data (P2) and the additional data (A) outputted from the absolute value outputting means, and a detecting waveform LUT for outputting detecting signal amplitude data (S) in accordance with the phase data (P3) outputted from the interpolating means.

When the phase data (P2) is transmitted, since the signal changes in the transmission line for every period 1/f2 of the clock frequency, such change appears as noise in some cases.

Accordingly, the phase data (P2) is not transmitted, and the difference data (V2) of the phase data (P2) is transmitted in the direct digital synthesizer for transmission and detection according to the eighteenth aspect. When difference of the phase data (P2) for every period 1/f2 of the clock frequency f2 is constant, noise is not generated because the signal does not change in the transmission line.

According the nineteenth aspect, the present invention provides the direct digital synthesizer for transmission and detection, in the direct digital synthesizer according to the eighteenth aspect, characterized in that a first space where the transmitting phase accumulator, the transmitting waveform LUT, the difference phase accumulator, the curtailing means, and the difference outputting means are provided is separated spatially from a second space where the absolute value outputting means, the interpolating means, and the detecting waveform LUT are provided.

In the direct digital synthesizer for transmission and detection according to the nineteenth aspect, when the difference data (V2) is transmitted to the second space from the first space and difference of the phase data (P2) is constant, noise is not generated because the signal does not change in the transmission line.

According to the twentieth aspect, the present invention provides the direct digital synthesizer for transmission and detection, in the direct digital synthesizer for transmission and detection according to the nineteenth aspect, characterized in that the clock frequency f1 is 40 MHz, the phase data (P1) of clock frequency f1 is 12 bits, the transmitting signal amplitude data (T) is 14 bits, the difference phase data (Δ1) is 12 bits, the phase data (P1') outputted from the adding means is 12 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and the detecting signal amplitude data (S) is 14 bits.

The direct digital synthesizer for transmission and detection according to the twentieth aspect is suitable for an MRI apparatus.

According to the twenty-first aspect, the present invention provides the direct digital synthesizer for transmission and detection according to any of the fifteenth to twentieth aspects where the difference outputting means provides an MRI apparatus characterized in outputting the difference data (V2) only in the predetermined period including the detecting period.

The MRI apparatus according to the twenty-first aspect outputs the difference data (V2) only in the predetermined period including the detecting period where it is not desired that noise is mixed into the receiving signal. During the other periods, the phase data (P2), for example, is outputted. During the period where the phase data (P2) is outputted, the absolute value outputting means is capable of outputting in direct the phase data (P2) inputted.

According to the twenty-second aspect, the present invention provides an MRI apparatus characterized by comprising the direct digital synthesizer for transmission and detection according to any of the fifth to tenth aspects.

The MRI apparatus according to the twenty-second aspect is capable of outputting the detecting signal amplitude data (S) with the clock frequency f3 higher than the clock frequency f2 of the phase data (P2) to be transmitted. Moreover, the frequency of transmitting signal and the frequency of detecting signal can also be varied.

According to the twenty-third aspect, the present invention provides an MRI apparatus characterized by comprising the direct digital synthesizer for transmission and detection according to any of the fifteenth to twenty-first aspects.

The MRI apparatus according to the twenty-third aspect is capable of outputting the detecting signal amplitude data (S) with the clock frequency f3 higher than the clock frequency f2 of the phase data (P2) to be transmitted. Moreover, the frequency of transmitting signal and the frequency of detecting signal can also be varied.

According to the direct digital synthesizer, direct digital synthesizer for transmission and detection, and MRI apparatus of the present invention, the amplitude data can be outputted with the clock frequency higher than the clock frequency of the phase data.

The direct digital synthesizer, and the direct digital synthesizer for transmission and detection of the present invention can be used for an MRI apparatus.

Further objects and advantages of the present invention will be apparent from the following description of the preferred embodiments of the invention as illustrated in the accompanying drawings.

DETAILED DESCRIPTION OF THE INVENTION

The present invention will be explained in more detail with reference to the embodiments illustrated in the accompanying drawings. The present invention is not restricted with the embodiments explained hereunder.

First Embodiment

Figure 1:
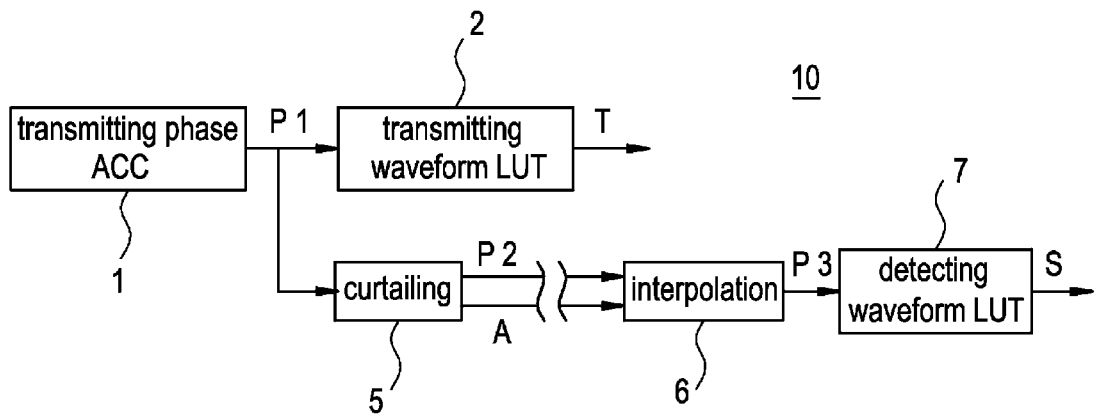
FIG. 1 is a block diagram illustrating a DDS for transmission and detection in relation to the first embodiment.

FIG. 1 is a block diagram illustrating a DDS (Direct Digital Synthesizer) for transmission and detection in relation to the first embodiment.

This DDS for transmission1 and detection 10 comprises a transmitting phase ACC (Accumulator) 1 for outputting phase data P1 with the clock frequency f1, a transmitting waveform LUT 2 for outputting transmitting signal amplitude data T in accordance with the phase data P1, a curtailing unit 5 for outputting phase data P2 with the clock frequency f2 (<f1) by implementing curtailing process to the phase data P1 and outputting also additional data A for compensating for phase information disappeared with curtailing process, an interpolating unit 6 for outputting phase data P3 with the clock frequency f3 (>f2) by implementing interpolating process in accordance with the phase data P2 and additional data A outputted from the curtailing unit 5, and a detecting waveform LUT 7 for outputting detecting signal amplitude data S in accordance with the phase data P3 outputted from the interpolating unit 6.

The transmitting phase ACC 1, transmitting waveform LUT 2 and curtailing unit 5 are mounted on a transmitting unit board of the MRI apparatus, while the interpolating unit and detecting waveform LUT 7 are mounted on a receiving unit board of the MRI apparatus, and the phase data P2 and additional data A are transmitted to the receiving unit board from the transmitting unit board via a mother board.

The clock frequency f1 is 40 MHz. The phase data P1 is 12 bits. The transmitting signal amplitude data T is 14 bits. The clock frequency f2 is 10 MHz. The phase data P2 is 12 bits, and the additional data A is 2 bits. The clock frequency f3 is 80 MHz. The phase data P3 is 12 bits. The detecting signal amplitude data S is 14 bits.

Figure 2:
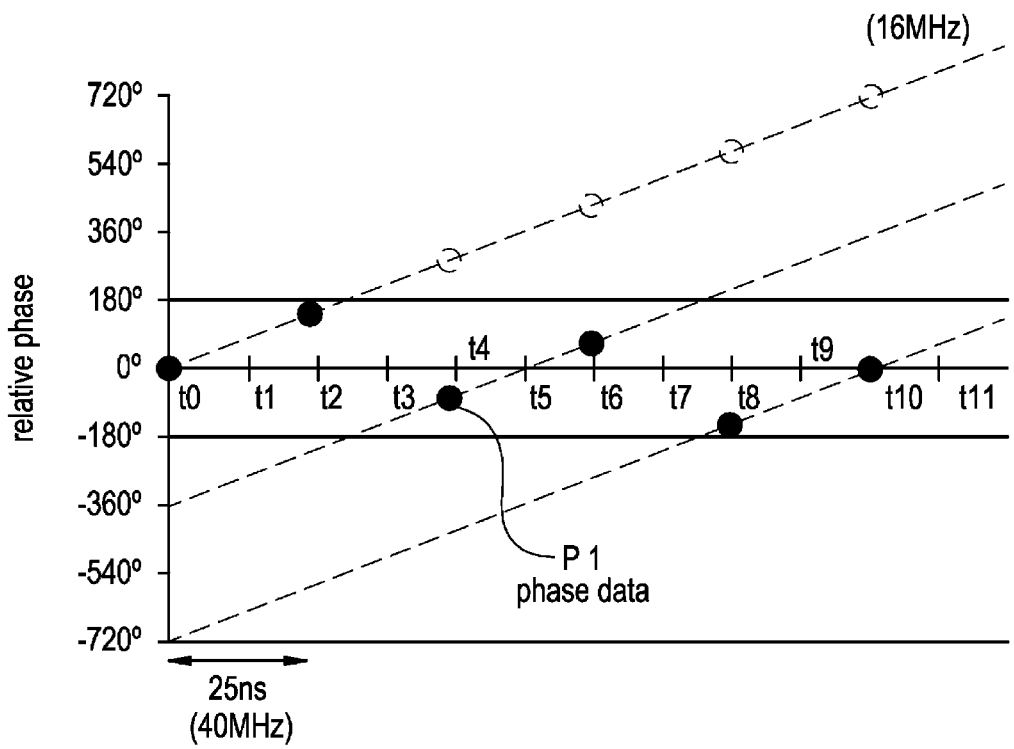
FIG. 2 is an explanatory diagram of phase data P1 with the clock frequency of 40 MHz.

FIG. 2 is an explanatory diagram of the phase data P1. This phase data P1 is considered, for example, as the phase data of the transmitting signal in the frequency of 16 MHz. The data of 12 bits showing the phase in the range of −180° to 180° indicated with the black circles in FIG. 2 are outputted at the times of t0, t2, t4, . . . in every 25 ns.

Figure 3:
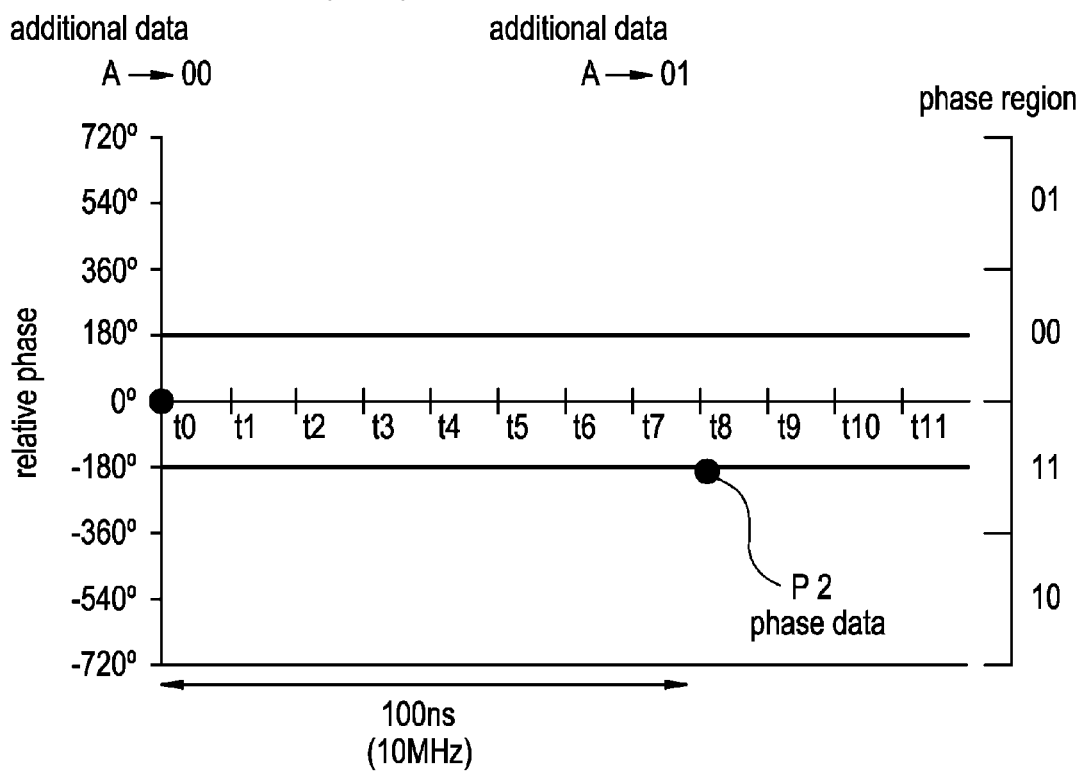
FIG. 3 is an explanatory diagram of phase data P2 with clock frequency of 10 MHz after curtailing and additional data A.

FIG. 3 is an explanatory diagram of the phase data P2 and the additional data A after the curtailing process. This phase data P2 can be obtained by curtailing the phase data of FIG. 2 into ¼. The data of 12 bits showing the phase in the range of −180° to 180° indicated with the black circles in FIG. 3 are outputted at the times of t0, t8, t16, . . . in every 100 ns.

The additional data A is the information indicating anyone of the phase regions 00=0° to 360°, 01=360° to 720°, 10=−360° to −720°, and 11=−360° to 0° to which the data of 12 bits showing the phase in the range of −180° to 180° indicated with the black circles in FIG. 3 actually belongs. Namely, the black circle at the time t0 indicates that the additional data A is 00 and belongs to the phase region of 0° to 180°, while the black circle at the time t8 indicates that the additional data A is 01 and belongs to the phase region of 360° to 720°.

Figure 4:
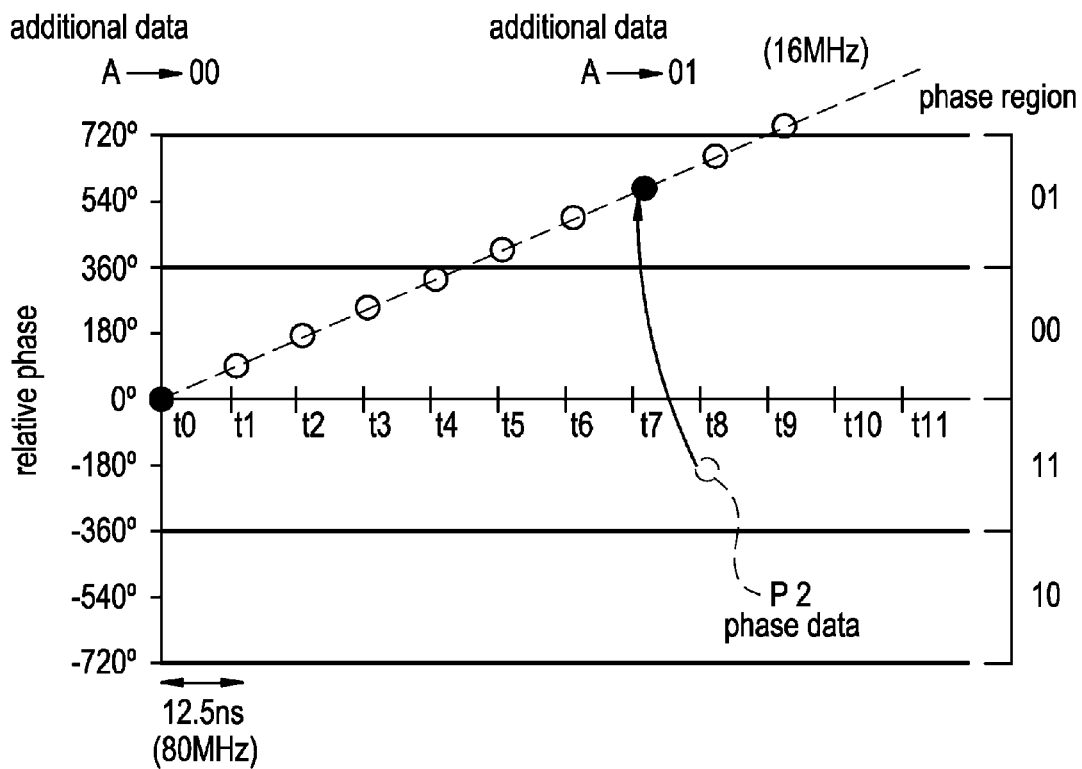
FIG. 4 is an explanatory diagram illustrating interpolating process to the phase data P2 with the clock frequency of 10 MHz.
Figure 5:
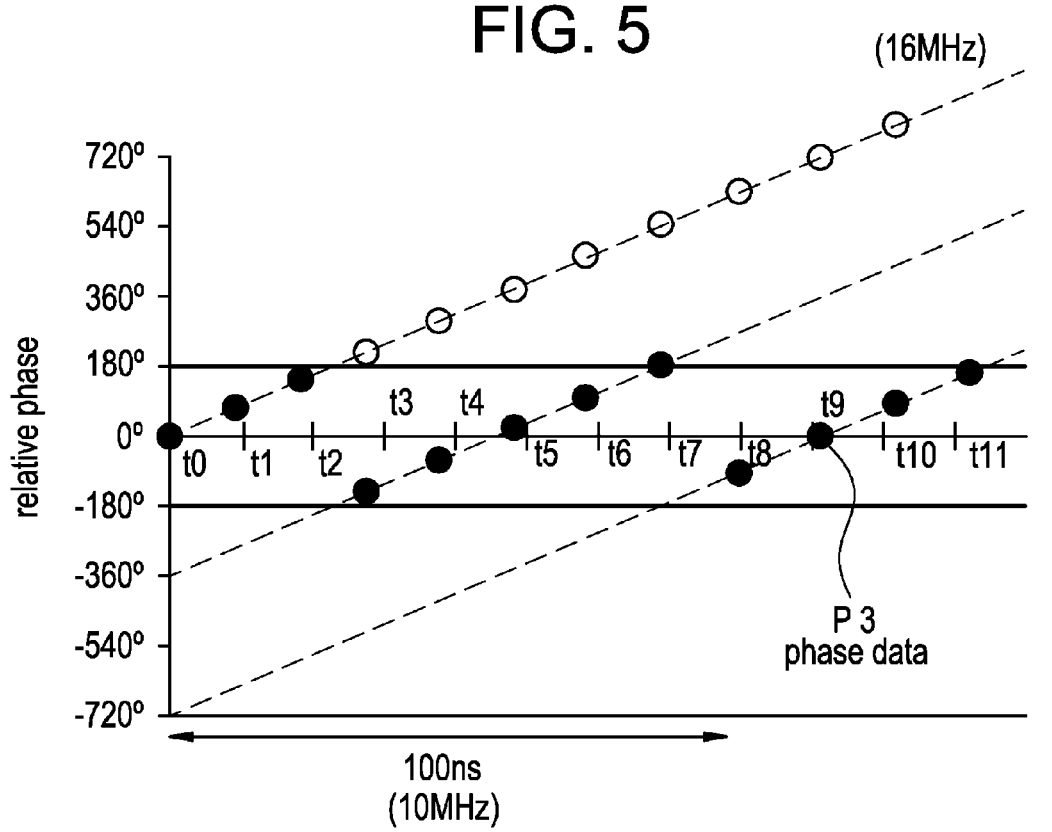
FIG. 5 is an explanatory diagram illustrating phase data P3 with the clock frequency of 80 MHz.

FIG. 4 and FIG. 5 are explanatory diagrams of the interpolating process.

(1) The phase data is converted to that within the phase region indicated by the additional data A by adding integer times of 360° to the phase data P2 in the range of −180° to 180°. Namely, since the additional data A of the phase data P2 received at the time t0 is "00", the phase data is changed to that within the phase region 00=0° to 360° by adding integer times of 360° to the phase data P2 in the range of −180° to 180°. Here, it is enough to add 0 time of 360°. That is, the black circle is returned to the original black circle. Moreover, since the additional data A of the phase data P2 received at the time t8 is "01", the phase data is changed to that in the phase region 01=360° to 720° by adding integer times of 360° to the phase data P2 in the range of −180° to 180°. Here, it is enough to add 2 times of 360°. Namely, the black circle is shifted to that exceeding 540°.

(2) As illustrated in FIG. 4, the phase data indicated with a white circle is calculated by interpolating between the black circles at the times t0 and t8.

(3) The phase data is converted to the phase data P3 of 12 bits showing the phase in the range of −180° to 180° indicated with the black circle of FIG. 5 by adding integer times of 360° to each phase data.

Figure 6:
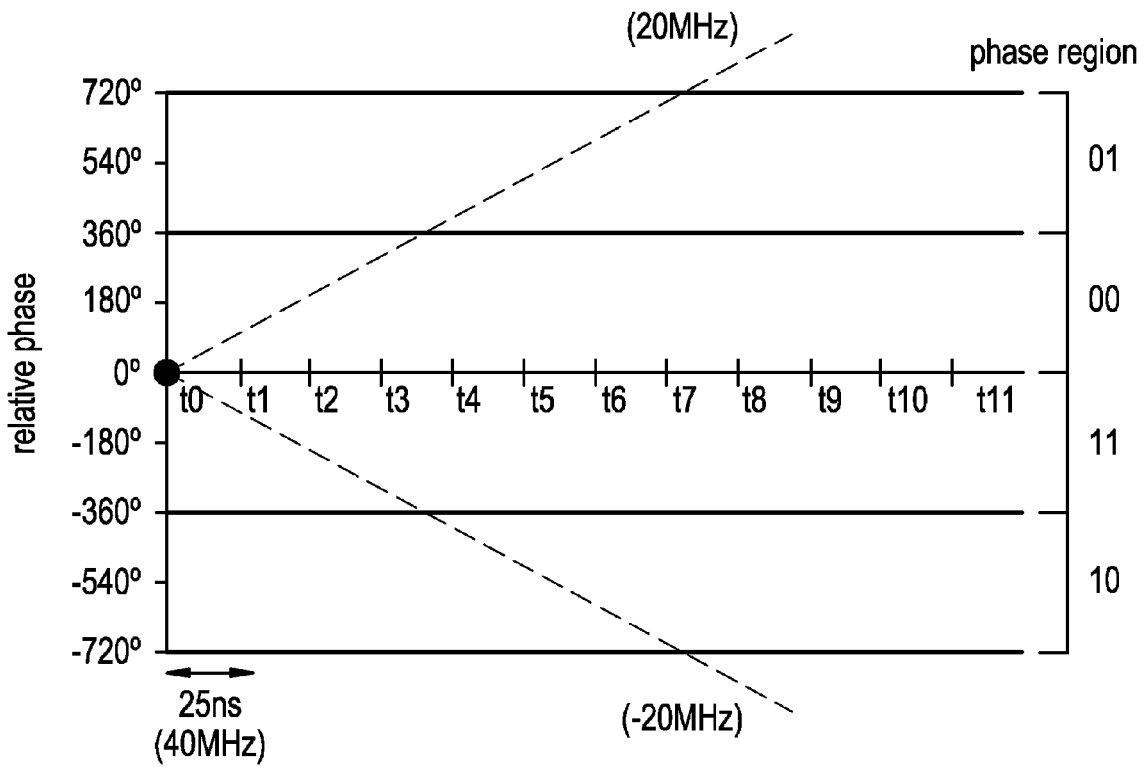
FIG. 6 is an explanatory diagram of phase regions.

FIG. 6 is an explanatory diagram of phase regions. When the clock frequency f1 of the phase data P1 is 40 MHz, the maximum frequency of the transmitting signal to be generated is ±20 MHz. Therefore, the frequency of the transmitting signal to be generated is within the range of the broken lines in FIG. 6. Namely, the actual phase data at the time t8 is within the range of ±720°. Accordingly, alias can be eliminated by dividing the range of ±720° into four phase regions of 360° and by indicating the phase region of the phase data P2 after the curtailing process with the additional data A. Since it is enough to distinguish the four phase regions, the additional data A becomes 2 bits.

When the clock frequency f1 of phase data P1 is 80 MHz and it is changed to the clock frequency f2 of 10 MHz through the curtailing process, it is required to discriminate eight phase regions and thereby the additional data A becomes 3 bits.

According to the DDS for transmission and detection 10 of the first embodiment, the detecting signal amplitude data S can be outputted with the clock frequency f3 higher than the clock frequency f2 of the phase data P2 transmitted.

Second Embodiment

Figure 7:
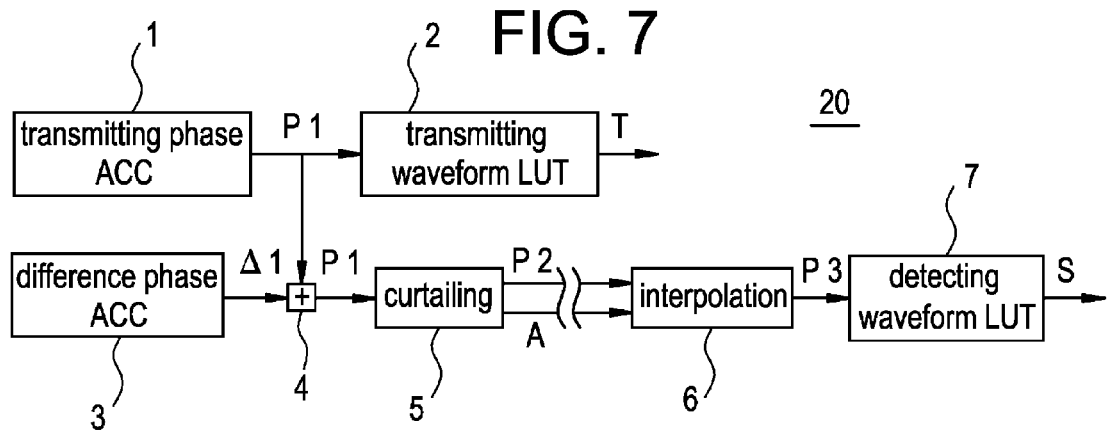
FIG. 7 is a block diagram illustrating the DDS for transmission and detection in relation to the second embodiment.

FIG. 7 is a block diagram illustrating the DDS for transmission and detection 20 in relation to the second embodiment.

This DDS for transmission and detection 20 is constituted by adding, to the direct digital synthesizer for transmission and detection 10 of the first embodiment, a difference phase ACC 3 for outputting difference phase data Δ1 with the clock frequency f1 and an adding unit 4 for outputting phase data P1' with the clock frequency f1 by adding the phase data P1 and the difference phase data Δ1 in view of implementing curtailing process with the curtailing unit 5 to the phase data P1' outputted from the adding unit 4.

The transmitting phase ACC 1, transmitting waveform LUT 2, difference phase ACC 3 and curtailing unit 5 are mounted on the transmitting unit board of the MRI apparatus, while the interpolating unit 6 and detecting waveform LUT 7 are mounted on the receiving unit board of the MRI apparatus. The phase data P2 and additional data A are transmitted to the receiving unit board from the transmitting unit board via the mother board.

The difference phase dataΔ1 is 12 bits. The phase data P1' is 12 bits.

According to the DDS for transmission and detection 20 of the second embodiment, the detecting signal amplitude data S can be outputted with the clock frequency f3 higher than the clock frequency f2 of the phase data P2 transmitted. Moreover, the frequency of transmitting signal (not the clock frequency f1) and the frequency of detecting signal (not the clock frequency f3) can be varied with the difference phase ACC 3.

Third Embodiment

Figure 8:
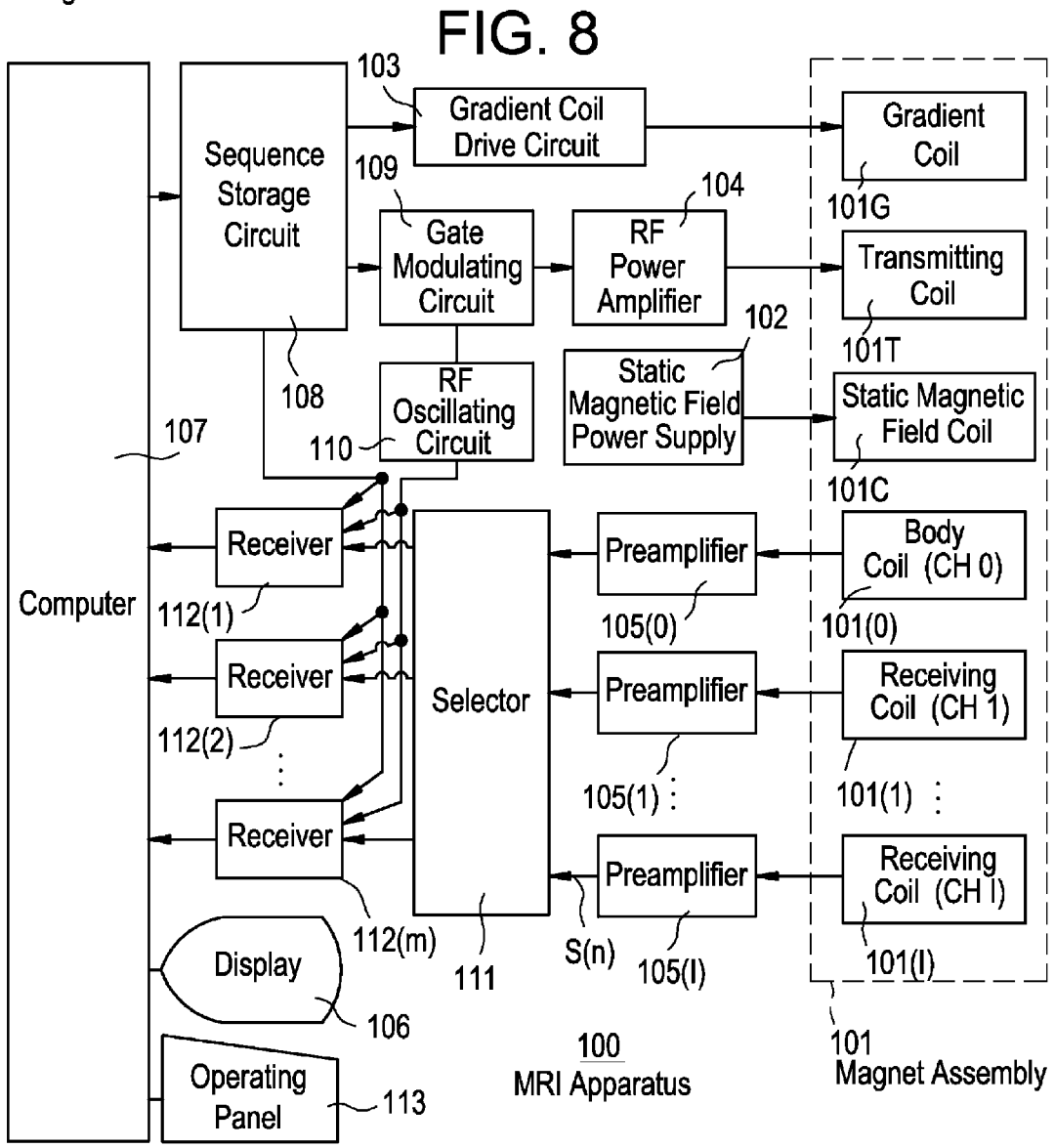
FIG. 8 is a block diagram illustrating an MRI apparatus in relation to the third embodiment.

FIG. 8 is a block diagram illustrating the MRI apparatus 100 of the third embodiment. In this MRI apparatus 100, a magnet assembly 101 is provided with a space (bore) for inserting a subject into the internal side of the apparatus. Moreover, a static magnetic field coil 101C for applying the constant static magnetic field to the subject, a gradient coil 101G for generating gradient magnetic fields of X-axis, Y-axis, and Z-axis, a transmitting coil 101T for giving RF pulse to excite the spin of atomic core in the subject, a body coil 101(0) for receiving the MR signal from the subject, and I-channel receiving coils 101(1), . . . , 101(I) are allocated to surround this space area. The static magnetic field coil 101C, gradient coil 101G, and transmitting coil 101T are respectively connected to a static magnetic field power source 102, a gradient coil drive circuit 103, and an RF power amplifier 104. Moreover, the body coil 101(0), receiving coils 101(1), . . . , 101(I) are respectively connected to pre-amplifiers 105(0), 105(1), . . . , 105(I).

The body coil 101(0) is sometimes used as the transmitting coil 101T. In addition, a permanent magnet may also be used in place of the static magnetic field coil 101C.

A sequence storage circuit 108 operates, in accordance with the commands from a computer 107, the gradient coil drive circuit 103 in accordance with pulse sequence stored, generates gradient magnetic field from the gradient coil 101G and operates a gate modulating circuit 109, modulates carrier output signal of an RF oscillating circuit 110 to the pulse signal of the predetermined timing, predetermined envelope, and predetermined phase, applies the modulated pulse signal to an RF power amplifier 104 as the RF pulse, and applies the RF pulse to the transmitting coil 101T after it is amplified with the RF power amplifier 104.

A selector 111 transfers the MR signal received by the body coil 101(0), and receiving coils 101 (1), . . . , 101(I) and amplified with the pre-amplifiers 105(0), 105(1), . . . , 105(I) to m receivers 112(1), 112(2), . . . , 112(m) to vary correspondence among the body coil 101(0), receiving coils 101(1), . . . , 101(I), and receivers 112(1), 112(2), . . . , 112(m).

The receivers 112(1), 112(2), . . . , 112(m) convert the MR signal into the digital signal and then inputs this digital signal to the computer 107.

The computer 107 generates MR images by reading the digital signal from the receiver 112 and by executing the processes. Moreover, the computer 107 executes the total control such as reception of information inputted from an operating panel 113.

A display device 106 displays images and messages.

The RF oscillating circuit 110 includes the transmitting phase ACC 1, transmitting waveform LUT 2 and curtailing unit 5 of the DDS for transmission and detection 10 of the first embodiment or the transmitting phase ACC 1, transmitting waveform LUT 2, difference phase ACC 3, adding unit 4 and curtailing unit 5 of the DDS for transmission and detection 20 of the second embodiment.

Moreover, each receiver 112(1), 112(2), . . . , 112(m) includes the interpolating unit 6 and detecting waveform LUT 7 of the DDS for transmission and detection 10 of the first embodiment or the interpolating unit 6 and detecting waveform LUT 7 of the second embodiment.

Fourth Embodiment

Figure 9:
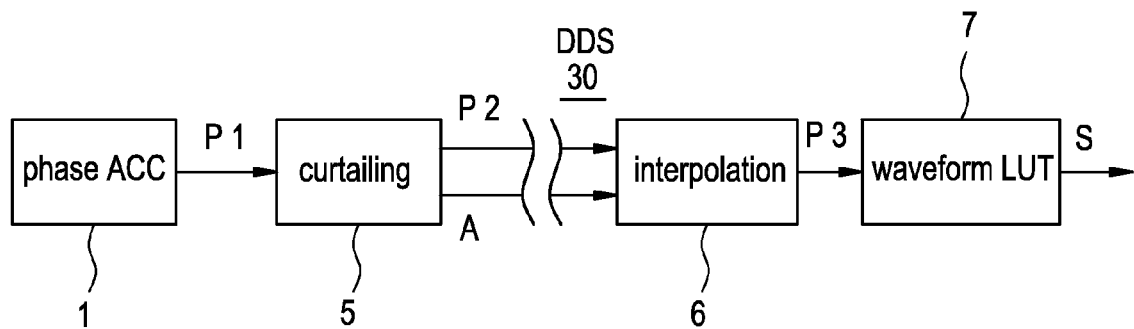
FIG. 9 is a block diagram illustrating the DDS in relation to the fourth embodiment.

FIG. 9 is a block diagram illustrating the DDS 30 of the fourth embodiment. This DDS 30 has the structure where the transmitting waveform LUT is removed from the structure of the DDS for transmission and detection 10 of the first embodiment.

According to this DDS 30, the output signal amplitude data S can be outputted with the clock frequency f3 higher than the clock frequency f2 of the phase data P2 transmitted.

Fifth Embodiment

Figure 10:
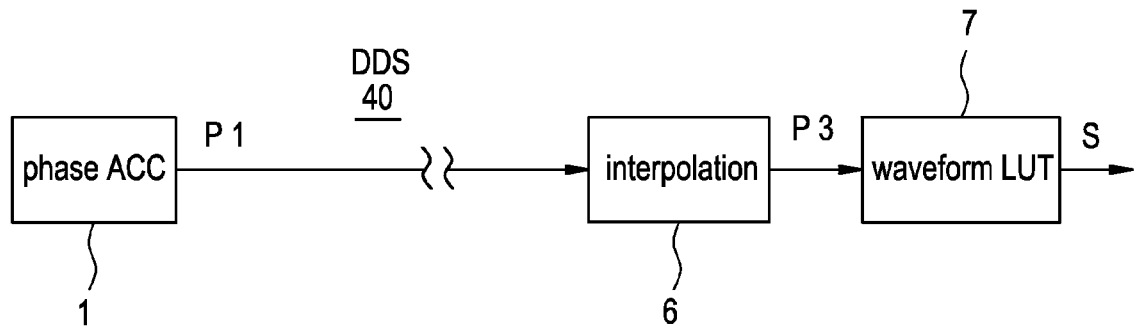
FIG. 10 is a block diagram illustrating the DDS in relation to the fifth embodiment.

FIG. 10 is a block diagram illustrating the DDS 40 of the fifth embodiment. This DDS 40 has the structure where the curtailing unit 5 is omitted from the structure of the DDS 30 of the fourth embodiment.

According to this DDS 40, the output signal amplitude data S can be outputted with the clock frequency f3 higher than the clock frequency f1 of the phase data P1 transmitted.

Sixth Embodiment

Figure 11:
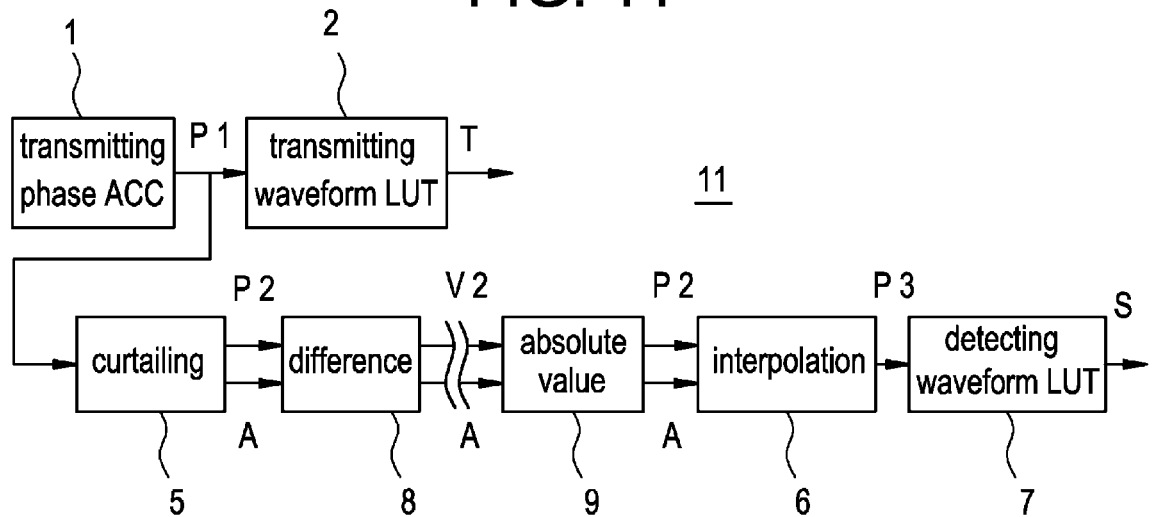
FIG. 11 is a block diagram illustrating the DDS for transmission and detection in relation to the sixth embodiment.

FIG. 11 is a block diagram illustrating the DDS for transmission and detection 11 of the sixth embodiment. This DDS for transmission and detection 11 has the structure that the difference outputting unit 8 for outputting difference data V2 of the phase data P2 outputted from the curtailing unit 5 and the absolute value outputting unit 9 for recovering and outputting the phase data P2 from the difference data V2 are added to the structure of the direct digital synthesizer for transmission and detection of the first embodiment, in order to output the phase data P3 with the clock frequency f3 (>f2), by implementing the interpolating process with the interpolating unit 6 in accordance with the phase data P2 and additional data A outputted from the absolute value outputting unit 9.

Figure 12:
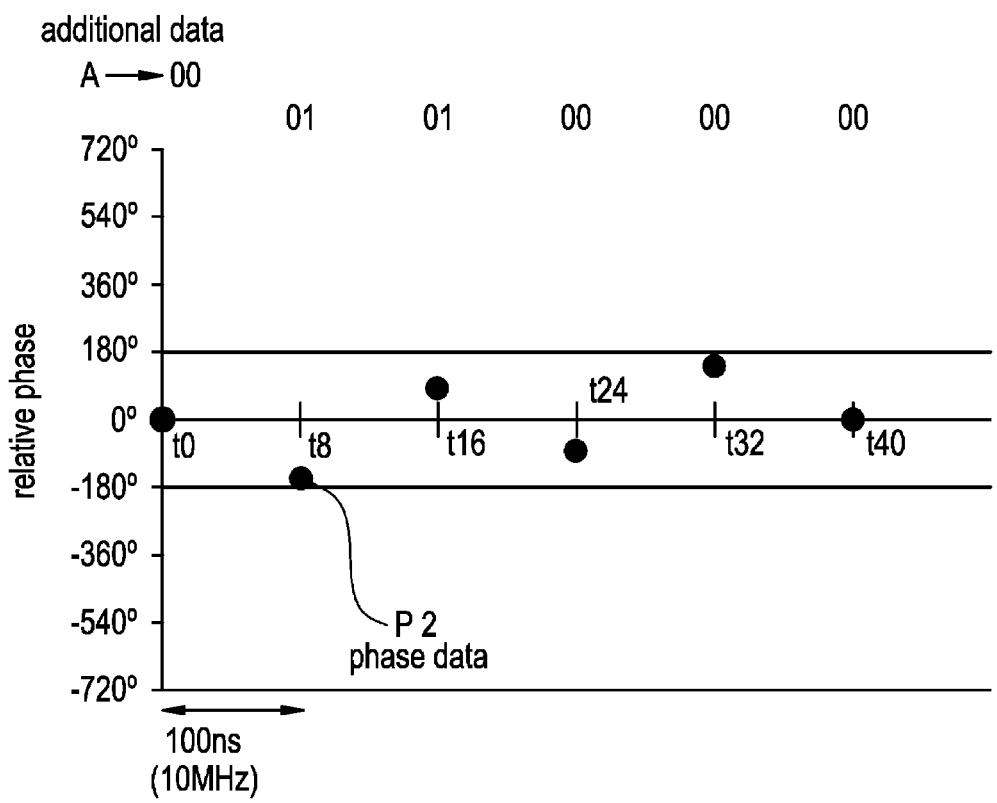
FIG. 12 is an explanatory diagram illustrating the phase data P2 with the clock frequency of 10 MHz and the additional data A.

FIG. 12 is an explanatory diagram of the phase data 2 and additional data A.

This phase data P2 is identical to that in FIG. 3. The phase becomes 0° at the time t0, −144° at the time t8, 72° at the time t16, −72° at the time t24, 144° at the time t32, and also 0° at the time t40.

Figure 13:
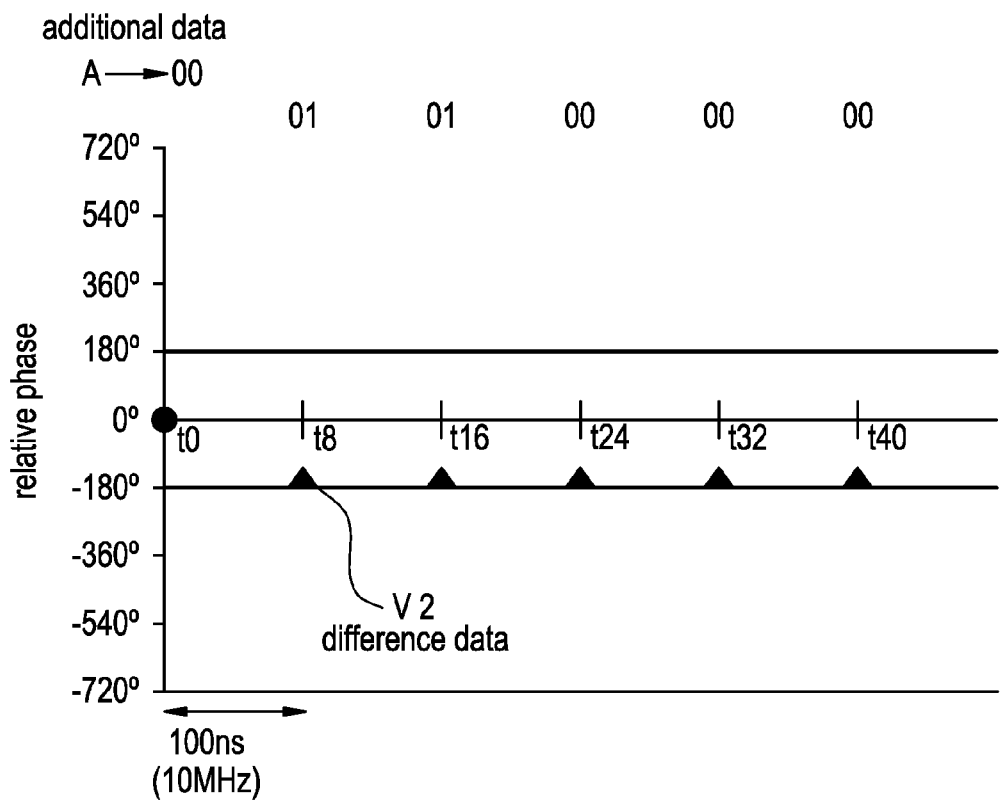
FIG. 13 is an explanatory diagram illustrating difference data V2 of the phase data P2 and the additional data A.

FIG. 13 is an explanatory diagram of the difference data V2 and additional data A.

This difference data V2 is 0° at the time t0, −144° at the time t8 and is fixed to −144° at the subsequent time.

The difference outputting unit 8 outputs 0° at the time t0, thereafter subtracts the value of phase data P2 of this time from the value of the preceding phase data P2, outputs difference when the difference obtained is in the range of −180° to 180°, and also outputs the value obtained by subtracting 360° from the difference value when the difference obtained is not in the range of −180° to 180°.

The absolute value outputting unit 9 sets the value of difference data V2 to the phase data P2 at the time t0, thereafter adds the value of difference data V2 to the present phase data P2, then outputs the sum of these values when the value obtained is in the range of −180° to 180°, and also outputs the value obtained by adding 360° to the value of sum when the obtained sum is not in the range of −180° to 180°.

According to the DDS for transmission and detection 11 of the sixth embodiment, noise is not generated because the difference data V1 does not change.

Seventh Embodiment

Figure 14:
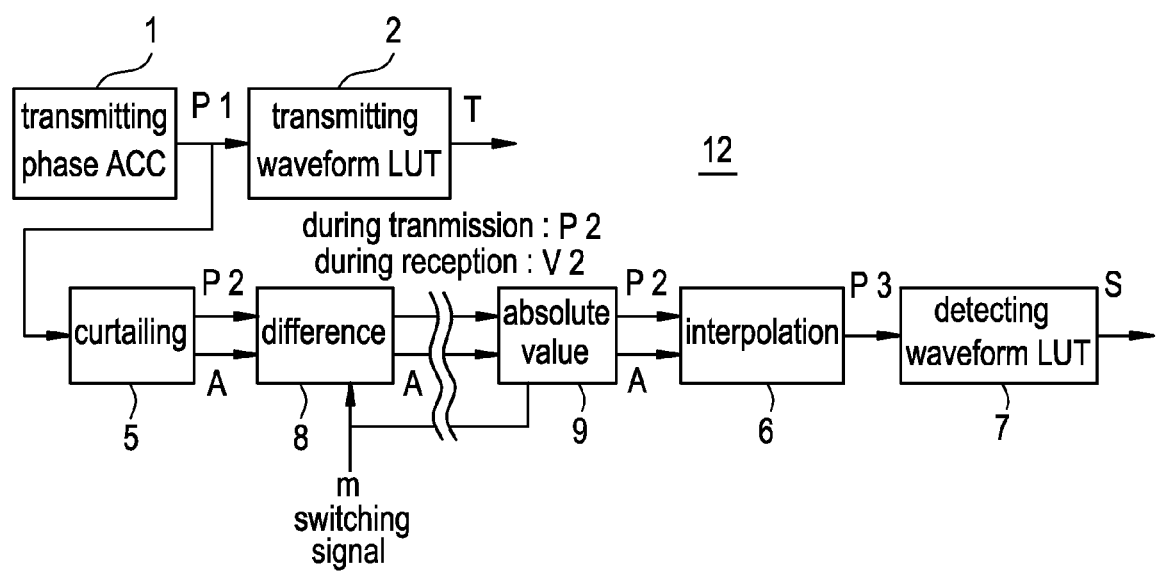
FIG. 14 is a block diagram illustrating the DDS for transmission and detection in relation to the seventh embodiment.

FIG. 14 is a block diagram illustrating the DDS for transmission and detection 12 in relation to the seventh embodiment. This DDS for transmission and detection 12 is modified in the structure of the direct digital synthesizer for transmission and detection 11 of the sixth embodiment.

The difference outputting unit 8 is switched with the switching signal m to output the difference data V2 during the receiving period of the MR signal and also output in direct the phase data P2 during the transmitting period of the RF signal. The switching signal m is given from the sequence storage circuit 108.

The absolute value outputting unit 9 is switched with the switching signal m to calculate and output the phase data P2 from the difference data V2 inputted during the receiving period of the MR signal and to output in direct the phase data P2 inputted during the transmitting period of the RF signal.

Eighth Embodiment

Figure 15:
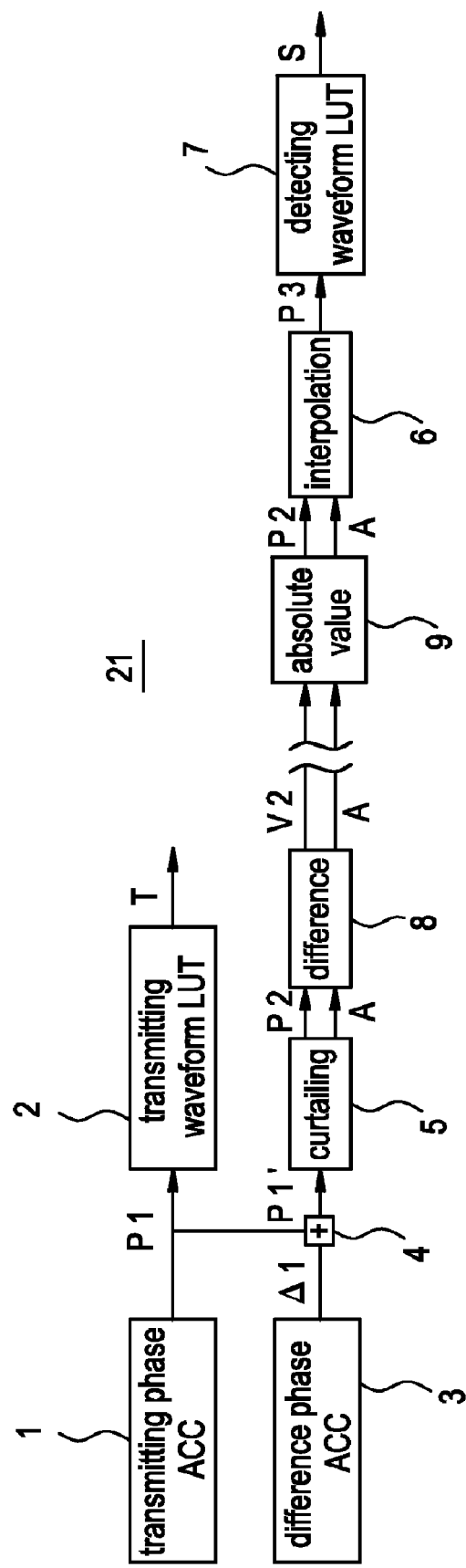
FIG. 15 is a block diagram illustrating the DDS for transmission and detection in relation to the eighth embodiment.

FIG. 15 is a block diagram illustrating the DDS for transmission and detection 21 in relation to the eighth embodiment. This DDS for transmission and detection 21 is constituted by adding the difference outputting unit 8 for outputting the difference data V2 of the phase data P2 outputted from the curtailing unit 5 and the absolute value outputting unit 9 for recovering and outputting the phase data P2 from the difference data V2 to the structure of the direct digital synthesizer for transmission and detection 20 of the second embodiment, in order to output the phase data P3 with the clock frequency f3 (>f2), by implementing interpolating process with the interpolating unit 6 in accordance with the phase data P2 and additional data A outputted from the absolute value outputting unit 9.

Ninth Embodiment

Figure 16:
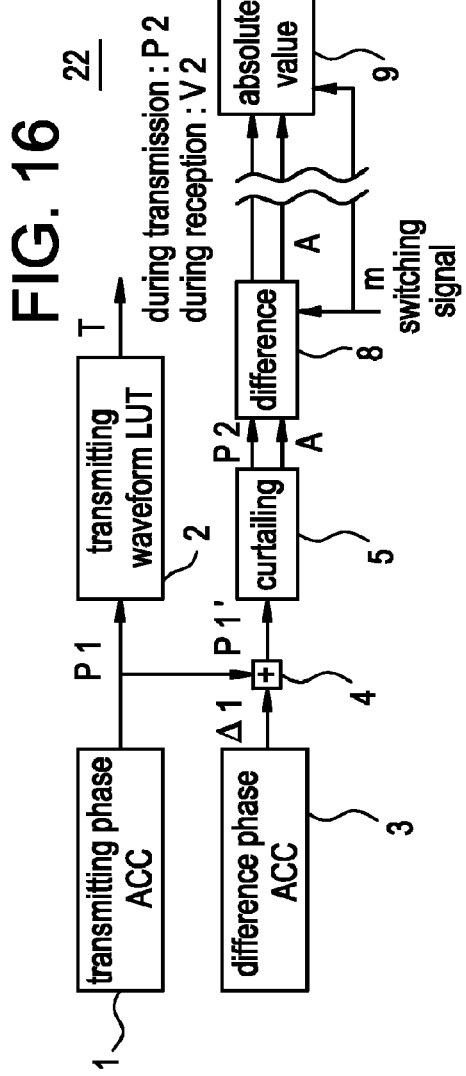
FIG. 16 is a block diagram illustrating the DDS for transmission and detection in relation to the ninth embodiment.

FIG. 16 is a block diagram illustrating the DDS for transmission and detection 22 in relation to the ninth embodiment. This DDS for transmission and detection 22 is constituted by deforming the structure of the direct digital synthesizer for transmission and detection 21 of the eighth embodiment.

The difference outputting unit 8 is switched with the switching signal m to output the difference data V2 during the receiving period of the MR signal and to output in direct the phase data P2 during the transmitting period of the RF signal. The switching signal m is given from the sequence storage circuit 108.

The absolute value outputting unit 9 is switched with the switching signal m to calculate and output the phase data P2 from the difference data V2 inputted during the receiving period of the MR signal and to output in direct the phase data P2 inputted during the transmitting period of the RF signal.

Tenth Embodiment

Figure 17:
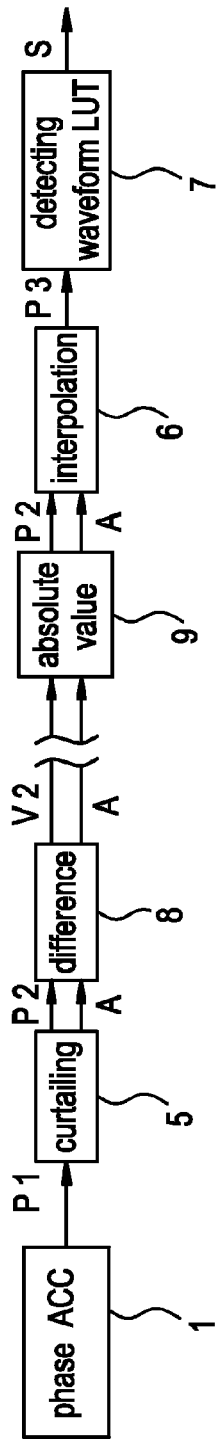
FIG. 17 is a block diagram illustrating the DDS for transmission and detection in relation to the tenth embodiment.

FIG. 17 is a block diagram illustrating the DDS 31 in relation to the tenth embodiment.

This DDS 31 is constituted by eliminating the transmitting waveform LUT 2 from the structure of DDS for transmission and detection 11 of the sixth embodiment.

Eleventh Embodiment

Figure 18:
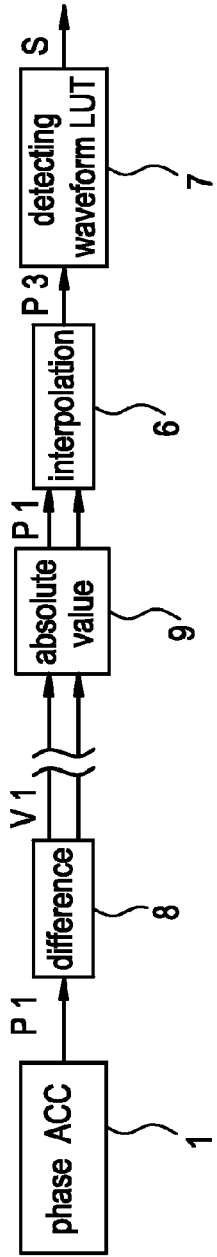
FIG. 18 is a block diagram illustrating the DDS for transmission and detection in relation to the eleventh embodiment.

FIG. 18 is a block diagram illustrating the DDS 41 in relation to the eleventh embodiment. This DDS 41 is constituted by eliminating the curtailing unit 5 from the structure of the DDS 31 of the tenth embodiment. Namely, the difference outputting unit 8 outputs the difference data V1 of the phase data P1 and the absolute value outputting unit 9 recovers and outputs the phase data P1 from the difference data V1.

Many widely different embodiments of the invention may be configured without departing from the spirit and the scope of the present invention. It should be understood that the present invention is not limited to the specific embodiments described in the specification, except as defined in the appended claims.

The invention claimed is:

1. A direct digital synthesizer for transmission and detection, comprising:
- a transmitting phase accumulator for outputting phase data (P1) with a clock frequency f1;
- a transmitting waveform LUT for outputting transmitting signal amplitude data (T) in accordance with said phase data (P1);
- a curtailing device for outputting phase data (P2) with a clock frequency f2 (<f1) by implementing curtailing process to said phase data (P1) and also outputting additional data (A) for compensating for phase information disappeared with said curtailing process;
- wherein said additional data (A) is assigned the binary value indicating which phase region said phase data (P2) belongs according to '00'=0° to 360°, '01'=360° to 720°, '10'=−360° to −720°, and '11'=−360° to 0° and said additional data (A) is assigned according to 360° times an integer where '00' is integer 0, '01' is integer 2, '10' is integer −2, and '11' is integer −1;
- an interpolating device for outputting phase data (P3) with a clock frequency f3 (>f2) by implementing interpolating process in accordance with said phase data (P2) and said additional data (A) outputted from said curtailing device;

and a detecting waveform LUT for outputting detecting signal amplitude data (S) in accordance with said phase data (P3) outputted from said interpolating device.

2. The direct digital synthesizer according to claim 1, wherein a first space where said transmitting phase accumulator, said transmitting waveform LUT, and said curtailing device are provided is spatially separated from a second space where said interpolating device and said detecting waveform LUT are provided.

3. The direct digital synthesizer for transmission and detection according to claim 1, wherein the clock frequency f1 is 40 MHz, the phase data (P1) of clock frequency f1 is 12 bits, the transmitting signal amplitude data (T) is 14 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and the detecting signal amplitude data (S) is 14 bits.

4. A direct digital synthesizer for transmission and detection, comprising:
   a transmitting phase accumulator for outputting phase data (P1) with a clock frequency 1;
   a transmitting waveform LUT for outputting transmitting signal amplitude data (T) in accordance with said phase data (P1);
   a difference phase accumulator for outputting difference phase data (A1) with the clock frequency f1;
   an adding device for outputting phase data (P1') with the clock frequency f1 by adding said phase data (P1) and said difference phase data (A1);
   a curtailing device for outputting phase data (P2) with a clock frequency f2 (<f1) by implementing curtailing process to said phase data (P1') outputted from said adding device and also outputting additional data (A) for compensating for phase information disappeared with said curtailing process;
   wherein said additional data (A) is assigned the binary value indicating which phase region said phase data (P2) belongs according to '00'=0° to 360°, '01'=360° to 720°, '10'=−360° to −720°, and '11'=−360° to 0° and said additional data (A) is assigned according to 360° times an integer where '00' is integer 0, '01' is integer 2, '10' is integer −2, and '11' is integer −1;
   an interpolating device for outputting phase data (P3) with a clock frequency f3 (>f2) by implementing interpolating process in accordance with said phase data (P2) and said additional data (A) outputted from said curtailing device;
   and a detecting waveform LUT for outputting detecting signal amplitude data (S) in accordance with said phase data (P3) outputted from said interpolating device.

5. The direct digital synthesizer for transmission and detection according to claim 4, wherein a first space where said transmitting phase accumulator, said transmitting waveform LUT, said difference phase accumulator, and said curtailing device are provided is spatially separated from a second space where said interpolating device and said detecting waveform LUT are provided.

6. The direct digital synthesizer for transmission and detection according to claim 4 wherein, the clock frequency f1 is 40 MHz, the phase data (P1) of clock frequency f1 is 12 bits, the transmitting signal amplitude data (T) is 14 bits, the difference phase data (Δ1) is 12 bits, the phase data (P1') outputted from said adding device is 12 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and the detecting signal amplitude data (S) is 14 bits.

7. A direct digital synthesizer for transmission and detection, comprising:
   a transmitting phase accumulator for outputting phase data (P1) with a clock frequency f1;
   a transmitting waveform LUT for outputting transmitting signal amplitude data (T) in accordance with said phase data (P1);
   a curtailing device for outputting phase data (P2) with a clock frequency f2 (<f1) by implementing curtailing process to said phase data (P1) and also outputting additional data (A) for compensating for phase information disappeared with said curtailing process;
   wherein said additional data (A) is assigned the binary value indicating which phase region said phase data (P2) belongs according to '00'=0° to 360°, '01'=360° to 720°, '10'=−360° to −720°, and '11'=−360° to 0° and said additional data (A) is assigned according to 360° times an integer where '00' is integer 0, '01' is integer 2, '10' is integer −2, and '11' is integer −1;
   a difference outputting device for outputting difference data (V2) of said phase data (P2); an absolute value outputting device for recovering and outputting said phase data (P2) from said difference data (V2);
   an interpolating device for outputting phase data (P3) with a clock frequency f3 (>f2) by implementing interpolating process in accordance with said phase data (P2) and said additional data (A) outputted from said absolute value outputting device;
   and a detecting waveform LUT for outputting detecting signal amplitude data (S) in accordance with said phase data (P3) outputted from said interpolating device.

8. The direct digital synthesizer for transmission and detection according to claim 7, wherein a first space where said transmitting phase accumulator, said transmitting waveform LUT, said curtailing device, and said difference outputting device are provided is spatially separated from a second space where said absolute value outputting device, said interpolating device, and said detecting waveform LUT are provided.

9. The direct digital synthesizer for transmission and detection according to claim 7, wherein the clock frequency f1 is 40 MHz, the phase data (P1) of clock frequency f1 is 12 bits, the transmitting signal amplitude data (T) is 14 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and detecting signal amplitude data (S) is 14 bits.

10. A direct digital synthesizer for transmission and detection, comprising:
   a transmitting phase accumulator for outputting phase data (P1) with a clock frequency f1;
   a transmitting waveform LUT for outputting transmitting signal amplitude data (T) in accordance with said phase data (P1);
   a difference phase accumulator for outputting difference data (A1) with the clock frequency f1;
   an adding device for outputting phase data (P1') with the clock frequency f1 by adding said phase data (P1) and said difference phase data (A1);
   an curtailing device for outputting phase data (P2) with a clock frequency f2 (<f1) by implementing curtailing process to said phase data (P1') outputted from said adding device and also outputting additional data (A) for compensating for phase information disappeared with said curtailing process;

wherein said additional data (A) is assigned the binary value indicating which phase region said phase data (P2) belongs according to '00'=0° to 360°, '01'=360° to 720°, '10'=−360° to −720°, and '11'=−360° to 0° and said additional data (A) is assigned according to 360° times an integer where '00' is integer 0, '01' is integer 2, '10' is integer −2, and '11' is integer −1:

a difference outputting device for outputting difference data (V2) of said phase data (P2);

an absolute value outputting device for recovering and outputting said phase data (P2) from said difference data (V2);

an interpolating device for outputting phase data (P3) with a clock frequency f3 (>f2) by implementing curtailing process in accordance with said phase data (P2) and said additional data (A) outputted from said absolute value outputting device;

and a detecting waveform LUT for outputting detecting signal amplitude data (S) in accordance with said phase data (P3) outputted from said interpolating device.

11. The direct digital synthesizer for transmission and detection according to claim 10, wherein a first space where said transmitting phase accumulator, said transmitting waveform LUT, said difference phase accumulator, said curtailing device, and said difference outputting device are provided is spatially separated from a second space where said absolute value outputting device, said interpolating device, and said detecting waveform LUT are provided.

12. The direct digital synthesizer for transmission and detection according to claim 10, wherein the clock frequency f1 is 40 MHz, the phase data (P1) of clock frequency f1 is 12 bits, the transmitting signal amplitude data (T) is 14 bits, the difference phase data (Δ1) is 12 bits, the phase data (P1') outputted from said adding device is 12 bits, the clock frequency f2 is 10 MHz, the phase data (P2) of clock frequency f2 is 12 bits, the additional data (A) is 2 bits, the clock frequency f3 is 80 MHz, the phase data (P3) of clock frequency f3 is 12 bits, and the detecting signal amplitude data (S) is 14 bits.

13. The direct digital synthesizer for transmission and detection according to claim 7, wherein said difference outputting device is an MRI (Magnetic Resonance Imaging) apparatus which outputs difference data only in the predetermined period including the detecting period.

14. The MRI apparatus comprising the direct digital synthesizer for transmission and detection according to claim 1.

15. The MRI apparatus comprising the direct digital synthesizer for transmission and detection according to claim 7.

16. The direct digital synthesizer for transmission and detection according to claim 10, wherein said difference outputting device is an MRI (Magnetic Resonance Imaging) apparatus which outputs difference data only in the predetermined period including the detecting period.

17. The MRI apparatus comprising the direct digital synthesizer for transmission and detection according to claim 4.

18. The MRI apparatus comprising the direct digital synthesizer for transmission and detection according to claim 10.

* * * * *